United States Patent [19]

Van Driel

[11] Patent Number: 4,839,855
[45] Date of Patent: Jun. 13, 1989

[54] MULTIPLE REDUNDANT CLOCK CIRCUIT

[75] Inventor: Carel-Jan L. Van Driel, Eindhoven, Netherlands

[73] Assignee: U.S. Philips Corporation, New York, N.Y.

[21] Appl. No.: 916,348

[22] Filed: Oct. 7, 1986

[30] Foreign Application Priority Data

Oct. 10, 1985 [NL] Netherlands ............... 8502768

[51] Int. Cl.[4] ............................................. G06F 1/04
[52] U.S. Cl. ...................................... 364/900; 307/464;
307/219; 371/36; 371/61
[58] Field of Search ............... 307/219, 464; 328/60,
328/63, 108; 371/36, 8, 61; 364/200 MS File,
900 MS File

[56] References Cited

U.S. PATENT DOCUMENTS

| 3,667,057 | 5/1972 | Pfersch, Jr. et al. | 371/36 |
|---|---|---|---|
| 3,805,235 | 4/1974 | Foster et al. | 371/36 |
| 3,900,741 | 8/1975 | Fletcher et al. | 307/464 |
| 4,375,683 | 3/1983 | Wensley | 371/36 |
| 4,402,045 | 8/1983 | Krol | 364/200 |
| 4,644,498 | 2/1987 | Bedard et al. | 364/900 |

OTHER PUBLICATIONS

Davies, D. et al., "Synchronization and Matching in Redundant Systems", IEEE Transactions on Computers, vol. C-27, No. 6, Jun. 1978, pp. 531-539.
Lewis, Daniel, "A Fault-Tolerant Clock Using Standby Sparing", Dig. of 9th IEEE Int. Symp. on Fault-Tolerant Computing, IEEE, 1979, pp. 33-39.

Primary Examiner—Gareth D. Shaw
Assistant Examiner—Jonathan C. Fairbanks
Attorney, Agent, or Firm—Thomas A. Briody; Jack E. Haken; Anne E. Barschall

[57] ABSTRACT

In a data processing device which consists of a plurality of parallel-operating modules, each of the four modules is provided with its own clock circuit. Synchronization is realized at the level of the cycle of the high frequency oscillation. This is realized in that each of the clock circuits includes a two-out-of-three majority decision device which is fed by the output clock signals of the other three clock circuits. The majority decision may have a simple logic structure and is connected to the actual clock function generator in order to reduce, using a readjustment circuit, the deviation between the clock function signal and the majority signal by a factor substantially smaller than one for each transition of the majority signal.

17 Claims, 6 Drawing Sheets $y_1(k) = x_3(k) + T_1$     1.1

$y_2(k) = x_3(k) + T_2$     1.2

$y_3(k) = x_2(k) + T_3$     1.3

$y_4(k) = x_2(k) + T_4$     1.4

$r_{2,1}(k+1) = r_{2,1}(k) + e_{2,1}(k) + F'_1(z_{2,1}(k)) * \{T_2 - T_1 - r_{2,1}(k)\}$     1.5

$r_{3,1}(k+1) = r_{3,1}(k) + e_{3,1}(k) + F'_1(z_{3,1}(k)) * \{-r_{3,2}(k) + T_3 - T_1 - r_{3,1}(k)\}$     1.6

$r_{4,1}(k+1) = r_{4,1}(k) + e_{4,1}(k) + F'_1(z_{4,1}(k)) * \{-r_{3,2}(k) + T_4 - T_1 - r_{4,1}(k)\}$     1.7

$r_{3,2}(k+1) = r_{3,2}(k) + e_{3,2}(k) + F'_2(z_{3,2}(k)) * \{-r_{3,2}(k) + T_3 - T_2 - r_{3,2}(k)\}$     1.8

$r_{4,2}(k+1) = r_{4,2}(k) + e_{4,2}(k) + F'_2(z_{4,2}(k)) * \{-r_{3,2}(k) + T_4 - T_2 - r_{4,2}(k)\}$     1.9

$r_{4,3}(k+1) = r_{4,3}(k) + e_{4,3}(k) + F'_3(z_{4,3}(k)) * \{T_4 - T_3 - r_{4,3}(k)\}$     1.10

$A_{min} = \max_{i,j} \{|d_i - d_j| + E/m, M*|T_i - T_j| + E, |T_i - T_j| * M/(1-M) + E/(1-M)\}$     1.11

$m = \min_i \{F'_i(x)\}$, $M = \max_i \{F'_i(x)\}$, $x \in D$, $0 < F'_i(x) < 1$, $E = \max_{i,j,k \geq 0} \{|e_{i,j}(k)|\}$     1.12

Fig. 12
(TABLE 1)

$F_i(y_i(k) - x_i(k)) = (T/2*\pi) * (B_i/A_i) * \sin((2*\pi/T)*(y_i(k) - x_i(k)))$     3.1

$-T/8 < y_i(k) - x_i(k) < T/8$     3.2

$F_i(y_i(k) - x_i(k)) = (B/A) * (y_i(k) - x_i(k))$;     3.3

$0 < F'_i(y_i(k) - x_i(k)) = (B_i/A_i) \ll 1$     3.4

$B_i/A_i = (B/A) * (1 \pm e_i)$     3.5

$0 < E/m < \max_i |e_i| * T/8$     3.6

Fig. 14
(TABLE 3)

$x_1(k) \leq x_2(k) \leq x_3(k)$; $-1 \leq a_i(k) \leq 1$  $\quad$ 2.1

$y_1(k) = .5*(x_2(k)+x_3(k)) + .5*h_1(k)*\{x_3(k)-x_2(k)\} + T_1.$  $\quad$ 2.2

$y_2(k) = .5*(x_1(k)+x_3(k)) + .5*h_2(k)*\{x_3(k)-x_1(k)\} + T_2.$  $\quad$ 2.3

$y_3(k) = .5*(x_1(k)+x_2(k)) + .5*h_3(k)*\{x_2(k)-x_1(k)\} + T_3.$  $\quad$ 2.4

$r_{2,1}(k+1) = r_{2,1}(k) + e_{2,1}(k) + F'_1(z_{2,1}(k)) *$
$\quad \{-1.5*r_{2,1}(k) - .5h_1(k)*r_{3,2}(k) + .5*h_2(k)*r_{3,1}(k) + T_2 - T_1\}$  2.5

$r_{3,2}(k+1) = r_{3,2}(k) + e_{3,2}(k) + F'_2(z_{3,2}(k)) *$
$\quad \{-1.5*r_{3,2}(k) - .5h_2(k)*r_{3,1}(k) + .5*h_3(k)*r_{2,1}(k) + T_3 - T_2\}$  2.6

$r_{3,1}(k+1) = r_{3,1}(k) + e_{3,1}(k) + F'_1(z_{3,1}(k)) *$
$\quad \{-1.5*r_{3,1}(k) - .5h_1(k)*r_{3,2}(k) + .5*h_3(k)*r_{2,1}(k) + T_3 - T_1$  2.7

$-r_{3,1}(k) < r_{i,j}(k+1) < r_{3,1}(k_j)$
$M = \max_i \{F'_i(x)\}$, $x \in D$, $0 < F'(x) < 1$  $\quad$ 2.8

$A_{min} = \max_{i,j} \{(|T_i - T_j| + E/m), (M*|T_i - T_j|/(1-M) + E/(1-M))\}$  $\quad$ 2.9

Fig. 13
(TABLE 2)

$r_{(i,j)}(k+1) = r_{(i,j)}(k) + F_i(y_i(k) - x_i(k)) +$
$\quad -F_j(y_j(k) - x_j(k)) =$  $\quad$ 4.1
$= r_{(i,j)}(k) + e_{i,j}(k) + F_j(z_{i,j}(k)) * \{(s_{i,j})(k) - r_{i,j}(k)\}$ $\max_{i,j \in c} |r_{i,j}(k)| \leq A_{max} \Rightarrow \max_{i,j \in c} |r_{i,j}(k+1)| \leq A_{max}$  $\quad$ 4.2

$\exists i,j \in c \mid r_{i,j}(k)| \geq A_{min} \Rightarrow \max_{i,j \in c} |r_{i,j}(k+1)|$
$\quad < \max_{i,j \in c} |r_{i,j}(k)|.$  $\quad$ 4.3

Fig. 15
(TABLE 4)

MULTIPLE REDUNDANT CLOCK CIRCUIT

I. BACKGROUND OF THE INVENTION

1. Field of the Invention

The invention relates to a data processing device which consists of a plurality of parallel-operating data processing modules and which includes a multiple redundant clock device which consists of clock circuits. Each clock circuit is assigned to a respective data processing module. The clock device also includes an interconnection network for communicating output clock signals between the respective clock circuits. Each clock circuit includes an input majority decision device for determining a majority signal from the output clock signals received. Each clock circuit also includes a clock function generator which includes a readjustment circuit for readjusting the clock function generator according to the majority signal by way of a control function in order to reduce a deviation between the clock function signal and the majority signal. Each clock circuit also includes an output element for forming the output clock signal of the relevant clock circuit from said clock function signal.

2. Prior Art

A data processing device of this kind is known from U.S. Pat. No. 4,402,045. The known device is a so-called (n,k) system, notably a (4, 2) system in which quadruplication of the processor capacity and doubling of the storage capacity (i.e. doubling of the storage capacity per data word) are used in order to ensure that the device remains operational even when one of the data processing modules breaks down. It has been proposed to provide such a data processing device with a multiple redundant clock device (column 11, lines 25-30 of the cited Patent Specification) so that a given failure in the clock device is also permissible.

In this respect reference is made to the article by D. Davies et al: Synchronizing and Matching in Redundant Systems, IEEE Tr. Comp. Vol. C27, No. 6, June 1978, pages 531-539. The clock device shown in FIG. 9 of the cited article includes three clock circuits which receive the output clock signals of all three clock circuits. On mathematical grounds it has been found that such a triplication offers insufficient protection, so that errors can still occur, even when two clock modules operate correctly

II. SUMMARY OF THE INVENTION

It is an object of the invention to provide a data processing device of the kind set forth in the Field of the Invention in which the synchronization between the clock at the level of the clock pulse cycle is maintained, both in the case of malfunctioning of at the most one or at the most two clock circuits, and in the case of an arbitrary signal configuration of such malfunctioning. It is a further object of the invention that the input majority decision device and the readjustment circuit have a simple logic structure. It is further object to enable a short signal delay time and hence a high clock frequency, oscillations being self-damping at the level of the single clock cycle, and the difference between the synchronized clock circuits always remaining small in as much as they are restricted by the accuracy of the electronic components. The above arbitrary signal configuration may concern the shape of the signal itself. It may also concern the shape of the relevant output clock signal received by the other clock circuits. This shape need not be the same for all other clock circuits.

The object in accordance with the invention is achieved in that there are provided four data processing modules, each of which includes a respective clock circuit, each input majority decision device receiving exclusively the output clock signals of the other clock circuits in order to determine a two thirds majority therefrom, the control function by the majority signal implementing a deviation reduction factor which is substantially smaller than 1 for each signal transition in the binary majority signal. Notably Exclusive-OR functions whose comparatively long signal delay times form a known drawback can thus be dispensed with. For example, when the aim is to achieve a clock frequency of 8 MHz, this means a half period of approximately 60 ns. The delay time of many commercially available components is approximately 10 ns. The spread of this delay time is also in the same order of magnitude. Due to these two effects, the error margin will be reduced by such a value when a very simple input majority decision device is used. If use were made of a more complex deviation determining device comprising a series connection of a plurality of such components, the resistance against errors of such a clock device would usually become illusionary.

The invention also relates to a multiple redundant clock device for use in such a data processing device as well as to a clock circuit for use in such a data processing device or such a clock device.

Further advantageous aspects are described in the dependent claims.

The majority decision device usually supplies a bivalent majority signal. The clock function generator supplies the clock function signal which is recurrent with the clock period. The clock function is readjusted by the readjustment circuit which receives the majority signal. In many embodiments the readjustment circuit is functionally combined with further parts of the clock function generator, so that it does not form a separate part thereof. The output element forms the output clock signal from the clock function signal for supply to the majority decision devices. In some embodiments the output element is notional. In other embodiments the output element can introduce a phase shift, for example, by inversion.

III. BRIEF DESCRIPTION OF THE FIGURES

The invention will be described hereinafter with reference to a number of figures and tables.

Figure 3:
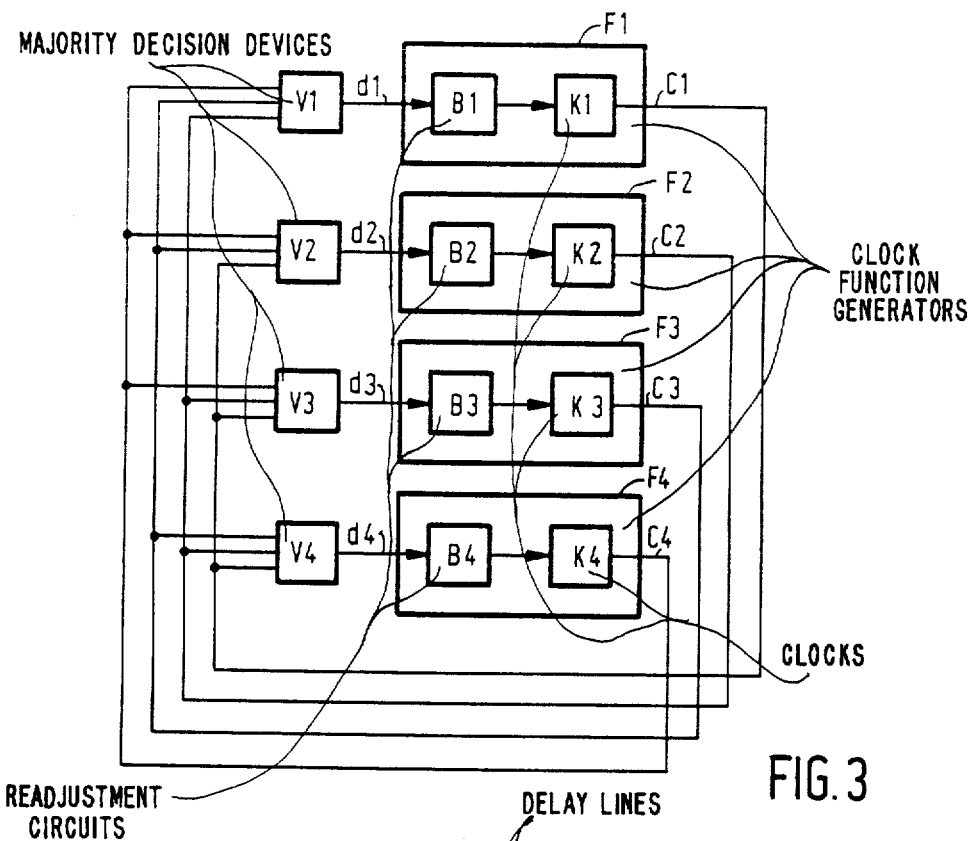
Figure 4:
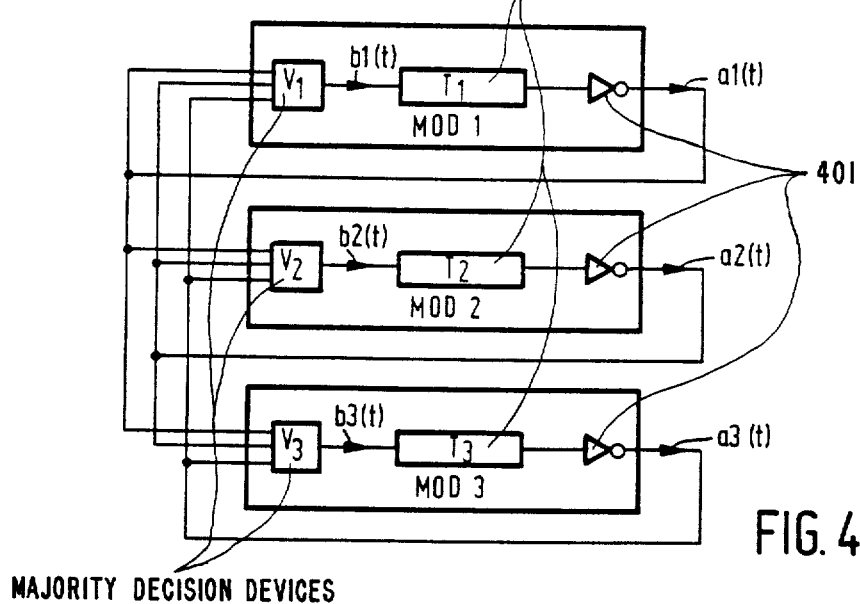
Figure 5:
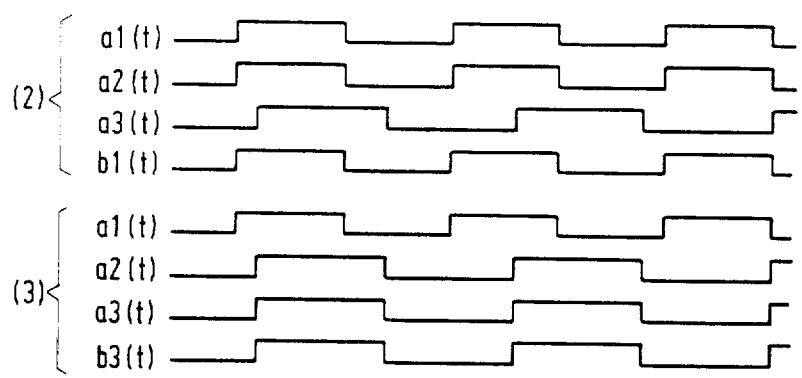
Figure 6:
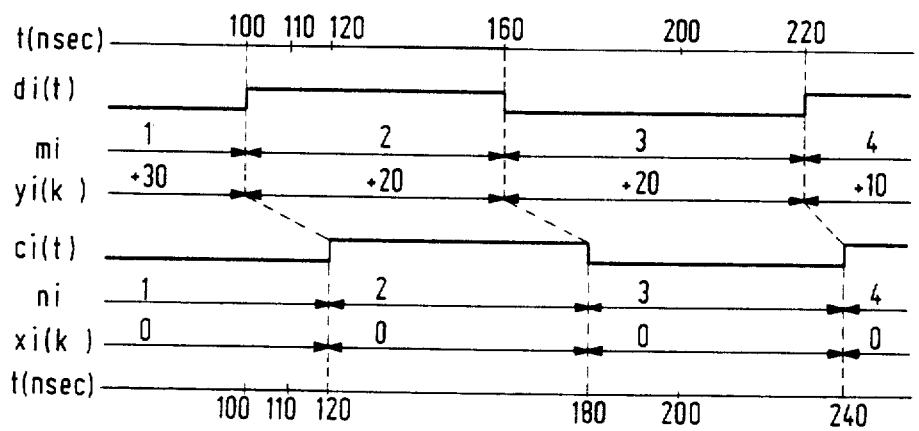
Figure 7:
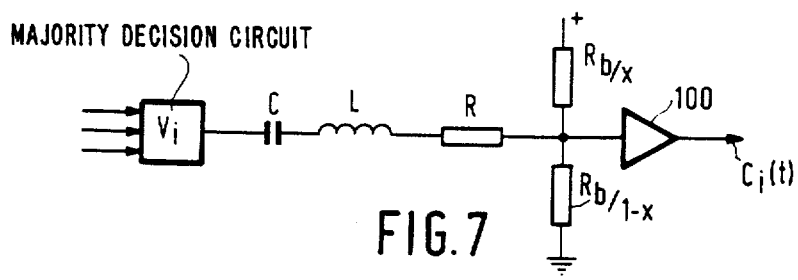
Figure 8:
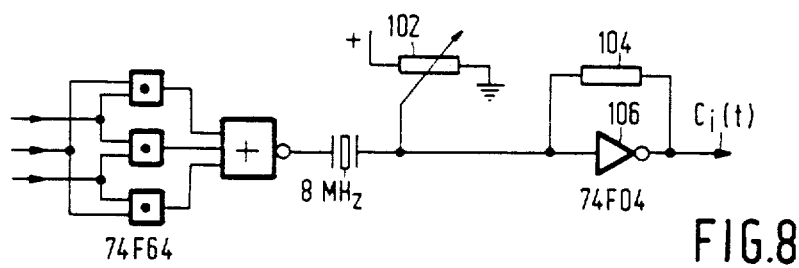
Figure 9:
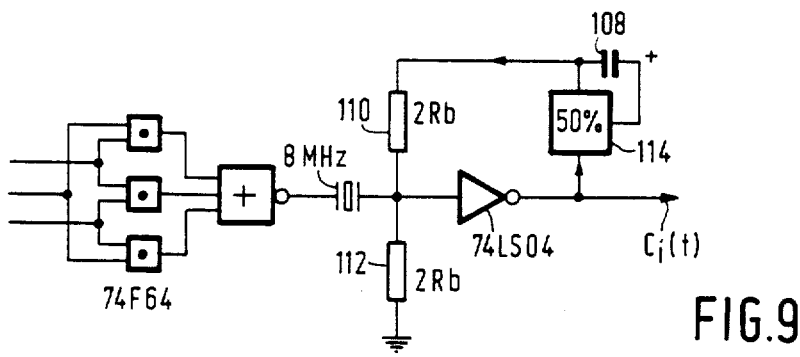
Figure 10:
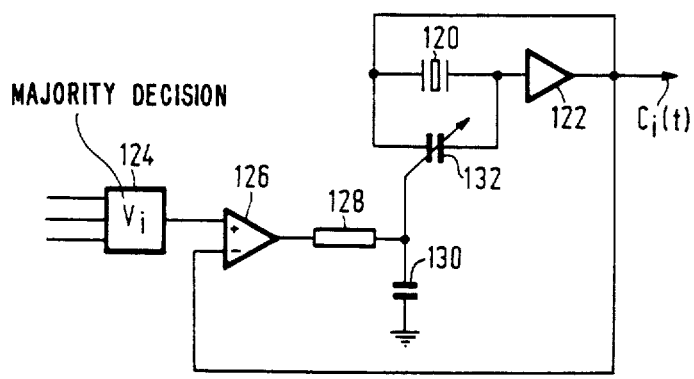
Figure 11:
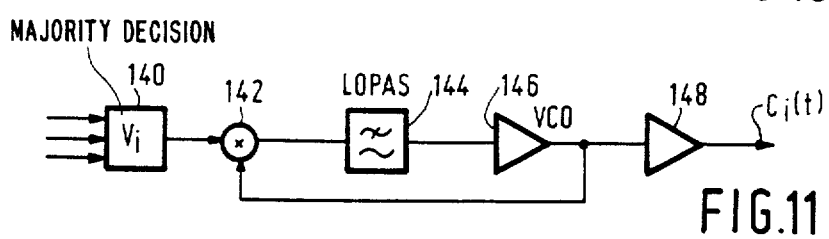

FIG. 3 diagrammatically shows a four-fold redundant clock device;

FIG. 4 illustrates a multiple clock device which cannot cope with a given error situation;

FIG. 5 illustrates this error situation and its consequences;

FIG. 6 shows the variation of various quantities as a function of time;

FIG. 7 shows a clock circuit which includes a filter circuit;

FIG. 8 shows a clock circuit which includes a crystal;

FIG. 9 shows an alternative embodiment of FIG. 8;

FIG. 10 shows a further alternative embodiment of FIG. 8;

FIG. 11 shows an alternative embodiment which includes a phase-locked loop;
FIG. 12 is Table 1 of formulae;
FIG. 13 is Table 2 of formulae;
FIG. 14 is Table 3 of formulae;
FIG. 15 is Table 4 of formulae.

IV. DETAILED DESCRIPTION OF THE PREFERRED EMBODIMENT

1. BRIEF DESCRIPTION OF A MULTIPROCESSOR COMPUTER SYSTEM

Figure 1:
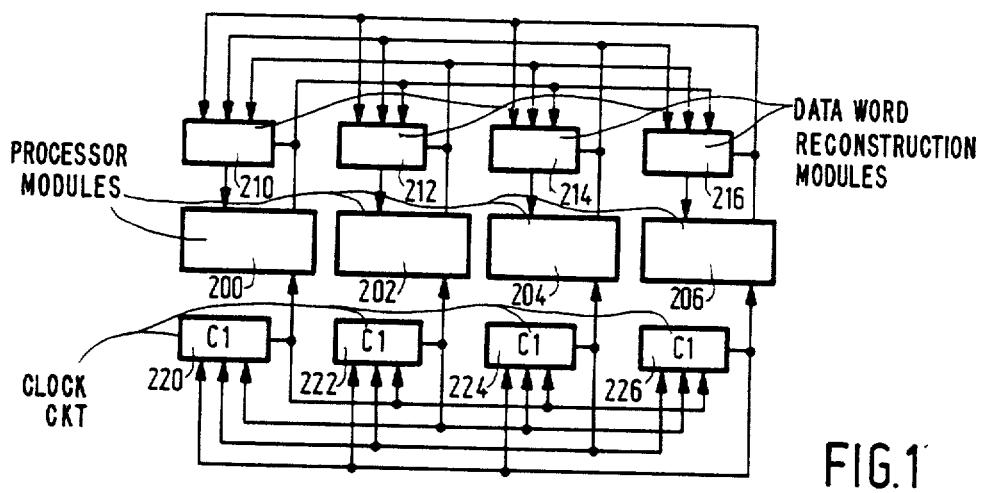
FIG. 1 shows a data processing device in accordance with the invention.

FIG. 1 shows a simple block diagram of a multiprocessor computer in accordance with the invention which includes a multiple redundant clock device. The computer includes four computer modules. Each computer module includes a processor module, its own clock circuit, and a data word reconstruction module. There are four processor modules: 200–206. Each clock circuit 220–226 applies clock signal to the associated processor. Each clock circuit also applies clock signals to all other clock circuits, and hence indirectly to the other processor modules. Each processor module applies its output data to all four data word reconstruction modules 210–216 which together constitute a data word reconstruction device. In each data word reconstruction module given data errors can be detected and/or corrected: the correct data is then applied to the associated processor module in which data processing can take place.

A computer subdivided into a number of modules is described in the cited U.S. Patent No. 4,402,045. Therein a code word consisting of code symbols is formed on the basis of a data word consisting of data symbols. After encoding, each computer module treats only a part of the code word, for example one code symbol. This operation concerns, for example memory storage, followed by reading and regenerating the code symbol. In order to reconstruct the entire data word for an arithmetic operation, all code symbols are applied to all computer modules. It has been found that the operation can be correctly performed even when, for example one computer module malfunctions completely.

In accordance with the set-up shown in FIG. 1, the various operations in the various computer modules are synchronized by the clock device which consists of the clock circuits 220–226. The operation of the data word reconstruction modules can also be synchronized in this manner, but is not shown. When one of the computer modules, for example the module including the blocks 202, 212, 222, breaks down (data or clock), the other three modules can continue to operate as usual. According to the cited reference, for a four-fold processing capacity in the arithmetic and logic unit (ALU) and the like, the system need only have a two-fold storage capacity in the memory in comparison with a single, non-redundant processor (in the terminology used, the processor thus also includes the foreground memory; the background memory and further peripheral apparatus will not be considered herein).

Similarly, another multiple redundant data processing device (for example, a communication system or a word processing system) may also include such a multiple redundant clock device. The improved clock device will be described hereinafter. At the level of the data processing device an improvement is achieved in that the output clock signal is applied to only three other clock circuits.

2. DESCRIPTION OF THE CLOCK DEVICE

Figure 2:
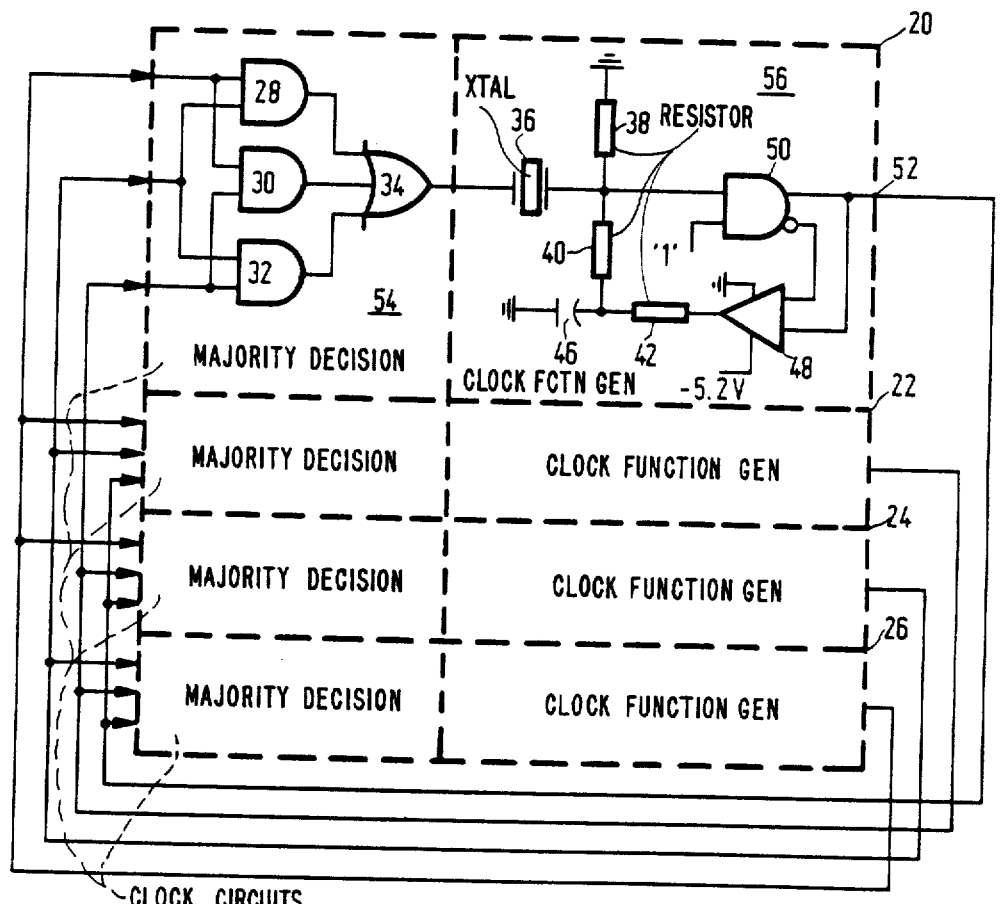
FIG. 2 shows a multiple redundant clock device for use in the device shown in FIG. 1.

FIG. 2 shows an embodiment of a multiple redundant clock device in accordance with the invention for use in the data processing device shown in FIG. 1. There are provided four clock circuits 20, 22, 24, 26 one of which is shown in detail at the gate level. The clock circuit 20 itself is described in the article by Davies et al, FIG. 9. This clock circuit includes three AND-gates 28, 30, 32 and one OR-gate 34. These gates together constitute the majority decision device 54. The other elements constitute the clock function generator 56. These elements are an 8-MHz crystal 36, resistors 38, 40, 42 (1000 ohms), a capacitor 46 (10 pF), an amplifier 50 (of the ECL type 10104 like the AND-gates) which has a non-inverting output and an inverting output which is denoted by a circle, and a voltage comparator 48 of the type LM311 which is connected in the manner shown. The feedback via the parts, 40, 42, 48, and 50 serves to adjust the duty cycle (the period during which the output clock signal is high, divided by the oscillation period) to substantially 50%. The readjustment of the oscillator circuit is realized by directly coupling the output signal of the majority decision circuit to the crystal connection. Other feasible clock circuits will be described hereinafter.

The cited article describes a clock device which consists of three clock circuits, the output clock signals thereof being applied to the inputs of all three majority decision circuits. It has been found by the present inventor that an incorrectly operating system is thus obtained in given circumstances, even when malfunctioning is limited to one clock circuit only. A first step in accordance with the invention consists in increasing the number of clock circuits to four. As will be described hereinafter, the clock device can then continue to operate correctly, even in the presence of an arbitrarily malfunctioning clock circuit. In accordance with FIG. 2, the output clock signal of the clock circuit 20 is applied only to the other three clock circuits 22, 24, 26, and is not fed back to the majority decision device of the own clock circuit. The same is applicable to the output clock signals of the other clock circuits. This is because feedback of an output clock signal to an input of the own clock circuit would necessitate a different method of treatment for the "own" output clock signal; such a method would require slow circuits, for example circuits utilizing Exclusive-OR gates.

3. DESCRIPTION OF THE SYNCHRONIZATION PROBLEM

FIG. 3 diagrammatically shows a four-fold redundant clock device. Each clock device includes a majority decision device (voter V1 . . . V4 which output respective majority signals d1 . . . d4. Each clock circuit also includes a clock function generator F1 . . . F4 which outputs an output clock signal c1 . . . c4. Each clock function generator is also shown to include a readjustment circuit B1 . . . B4 and a clock K1 . . . K4.

In this respect the FIGS. 4, 5 illustrate a triple clock device and an error situation which cannot be dealt with by this device, respectively. FIG. 4 shows three clock circuits which all receive the output clock signals a1 . . . a3. The majority decision devices V1 . . . V3 operate in the manner described with reference to FIG. 2 and output the signals b1 . . . b3. The elements T1, T2, T3 are delay lines having a delay of one half local clock period. The construction of an oscillator circuit by means of such elements, for example formed as a series connection of an odd number of inverters, is known per se. Finally, a respective inverter 401 is connected to the output of each delay line. FIG. 5 shows a feasible error situation when the second clock circuit malfunctions: this clock circuit supplies the upper clock circuit with a signal which is the same as a1(t) and the lower clock circuit with a signal which is the same as a3(t). The first three curves in FIG. 5 represent the three signals a1 ... a3 as seen by the upper clock circuit. The fourth curve represents the signal b1(t) formed by the majority decision device V1. The next three curves represent the three signals a1 ... a3 as seen by the lower clock circuit. The last curve represents the signal b3(t) formed by the majority decision device V3. It appears that the phase differences between the output clock signals b1(t) and b3(t) thus increases continually. When the same error pattern occurs in the circuit disclosed in the cited article, essentially a similar incorrect behaviour will be observed. Furthermore, various other error situations exist which can lead to such a desynchronizing system.

Therefore, the requirements to be imposed on an error-tolerant multiple clock device are as follows:

(a) when the phase difference between any pair of correctly operating clock circuits does not exceed a first limit value, this phase difference may not exceed this limit value either at a later instant (this will be demonstrated by the formula 4.2 of table 4 to be discussed hereinafter);

(b) when the phase difference between any pair of correctly operating clock modules exceeds a second limit value, this difference should increase in time (self-synchronizing). The decrease need not always be monotonic (this will be demonstrated by the formula 4.3). The two limit values may be the same or not; in any case they are smaller than one half clock period.

4. FORMAL DESCRIPTION OF AN ERROR-TOLERANT SYSTEM

Hereinafter the "clock period" of a binary signal will be defined as an integer number which is incremented by one in reaction to each signal transition. The clock period of the signal $c_i(t)$ is $n_i$ and the clock period of the signal $d_i(t)$ is $m(i)$. The shift of the signal $c_i(t)$ on the clock period $n_i = k$ is referred to as $x_i(k)$. The shift of the signal $d_i(t)$ on the clock period $m(i) = k$ is referred to as $y_i(k)$. FIG. 6 shows an example of these quantities in a time diagram, the time being measured, for example in ns ($10^9$s). Between two successive signals the shift of the relevant signal remains unchanged.

Also defined is the difference in time shift between two clock signals:

$$r(i,j)(k) = x_i(k) - x_j(k) \text{ for } c_i(t), c_j(t)$$

$$s(i,j)(m) = y_i(m) - y_j(m) \text{ for } d_i(t), d_j(t).$$

For the description given hereinafter it is assumed that the majority decision device instantaneously determines the majority function, which determination is followed by a delay, after which the binary majority signal becomes available. A delay also occurs at the input of the clock function generator: these delays are represented together by Ti. The signal di appears at the output of this delaymechanism.

It is assumed that D is the closed interval between two real limits for which the function Fi is defined. For Fi it holds good that for each value of x in the interval D the function Fi is continuous and differentiable, its derivative being positive and smaller than 1. This derivative is the deviation reduction factor, that is to say the factor whereby a deviation between two signals is reduced. When this factor is high, for example close to 1, the deviation will be quickly reduced. When this factor is low, the reduction of the deviation will take longer. It has been found that the deviation reduction factor is preferably substantially less than 1, for example less than 0.8. This is because the susceptibility to disturbances is thus reduced, because the disturbance becomes only partly (or delayed by one or more periods) manifest in the output signal. In that case an incidental disturbance need not cause a loss of stability. The unfavourable properties of the circuit shown in FIG. 4 are inter alia caused by the fact that the deviation reduction factor has the value 1: any deviation will be immediately passed on in its entirety. Usually an even smaller value will be advantageous, for example a value smaller than or equal to 0.5 or even a value between 0.01 and 0.1. It holds good in general that as the deviation reduction factor is lower the stability of each individual clock circuit will be higher. However, the speed of reaction to a variation, for example a switch-on phenomenon will be slower. In some cases the initiation of synchronization will be strongly impeded when the reduction factor is low. However, positive results have also been obtained for such low values. Because of its high stability, a deviation reduction factor of, for example 0.001 may occur for a crystal. The derivative of Fi is referred to as Fi'. It is assumed that:

$$F_i(y_i(k) - x_i(k)) - F_j(y_i(k) - x_i(k)) = e_{i,j}(k);$$
$$x_i(k+1) = x_i(k) + F_i(y_i(k) - x_i(k)).$$

In that case there will be a quantity $z_{i,j}(k)$ between $y_i(k) - x_i(k)$ and $y_i(k) - x_j(k)$ for which the formule 1 of table 4 holds good (notation 4.1). Expressed in words this formule means that the difference between the two signals at the instant $(k+1)$ is equal to the difference between these two signals at the instant $(k)$, increased and decreased, respectively, by an amount which depends on the signals at the instant k. Actually, the deviation is corrected for by the reduction factor (first expression), after which the known indermediate-value theorem is applied. A delay line can in principle be used as a function generator for Fi. However, because the respective deviation reduction factor $F'_i + 1$, it will not be suitable. Good results, however, can be obtained by means of a phase-locked loop (PLL), a band filter (notch filter) and a crystal.

Subsequently: when the phase shifts (skew) between the clock modules are small, it holds good for a multiple redundant clock device comprising n clock circuits of which at least G circuits operate correctly, that there exists a finite number $A_{max}$ and an integer number $k > 0$, so that for the sub-set of correctly operating clock modules in the formule 4.2 holds good (see the above paragraph a). This means that a sufficiently accurate synchronization will no longer be lost, provided at least that no new malfunction occurs among the mutually synchronized clock circuits. Moreover, the condition of formule 4.3 is applicable.

The proof of the second condition (the above paragraph b) for a system including four correct modules is given in table (1) where, without prejudice to its generality: $x1(k) \leq x2(k) \leq x3(k) \leq x4(k)$. The formulas 1.1 ... 1.4 follow therefrom. The formulas 1.5 ... 1.10 follow from the definition of $r_{i,j}(k+1)$. If it is stipulated that $|r_{i,j}(k+1)| \leq r_{4,l}(k)$, the necessary and adequate condition of formula 1.11 is applicable, together with the definitions and conditions stated for 1.12.

The above first condition holds good for $A_{max} \geq A_{min}$, because if $0 < r_{i,j}(k) \leq A_{max}$, $i > j$, and $0 < F'(x) < 1$, there will be found $|r_{i,j}(k+1)| \leq A_{max}$.

5. PROOF FOR ONE MALFUNCTIONING MODULE

In the case of one malfunctioning clock module (for example, No. 4) only the formulae for $y_i(k)$ will be different. Assume that table 2, formula 2.1 is applicable; in that case the formulae 2.2 ... 2.4 hold good. Therein, $h_i(k)$ represents the effect of the signal of the malfunctioning (fourth) module on the process in the $i^{th}$ $i = 1, 2, 3$) module. The prefactor 0.5 represents the effect of the majority decision. Subject to the condition of the formula 2.8 which does not imply a further restriction, the original second condition will hold good for formula 2.9. The original first condition will hold good for $A_{max} \geq A_{min}$.

6. FEASIBLE CLOCK CIRCUIT IMPLEMENTATIONS:

FIG. 7 shows a clock circuit which includes a filter circuit. The function F can now be written as the formula 3.1, in which T is the period of the input signal and $A_i$ is much larger than $B_i$. Subject to the condition 3,2, 3.1 can be approximated by 3.3. This results in 3.4. The factor E is determined mainly by the accuracy of the components. If (3.5) is applicable, 3.6 will follow therefrom. For example, if $\max_i(e_i) = 0.01$ and $T = 125$ ns, the following will hold good: $0 < E < 1.4$ ns. Electronic components having a short delay time and a comparatively small spread in the value of the delay are known for example from the catalogue FAST TTL LOGIC SERIES, published by Signetics Corporation, book IC 15 N, February 1984. The majority decision device can be formed by the component 74F64 (page 35.7 ff. of said book). This component has a delay time spread between 2.5 and 7 ns, so at the most 4.5 ns. A usually necessary inverting buffer will generally also imply a spread of 2 ns. The maladjustment of the frequency with respect to the optimum frequency of the relevant crystal can usually also imply a spread of 2 ns, thus in total a spread of 8.5 ns. Together with an additional spread caused by the comparison of the frequencies, this means a total of approximately 10 ns, which is an acceptable value for the relevant application. The output OR-gate of the majority decision device is wired internally in the FAST circuit. As indicated, two resistors from a voltage divider between the supply voltage (+) and ground. The output includes a buffer 100 which supplies a square-wave signal.

The same analysis is applicable when use is made of a crystal (FIG. 8). The only problem is due to higher harmonics of the oscillation frequency. These harmonics can remain negligibly small when the load capacitance $C_b$ and the load resistance $R_b$ of the series circuit are suitably chosen. For $T = 125$ ns (8 MHz), it can be calculated that $R = 2.5 \ldots 5$ kohms, $C_b = 10 \ldots 20$ pF. In a practical realization, soldered connections and connection points already imply 10 pF. The factor $e_i$ is approximately equal to the sum of the tolerances of the load resistance and the load capacitance. This is because the resonant frequency of the crystal is accurate to from $10^{-5}$ to $10^{-6}$ and in the same order of magnitude as that of the components in the equivalent diagram. When the components exhibit a spread of 5% ($e_i = 0.05$), the most unfavourable phase shift will be approximately 10 ns. The circuit also includes a variable resistor 102, a damping resistor 104 and an inverter 106 (type 74 F 04) in order to compensate for the inversion effect of the majority decision device.

FIG. 9 shows an alternative embodiment for fixing the duty cycle at 50%. To this end, in addition to the presence of the capacitor 108 and the voltage divider 110/112, the output clock signal $c_i(t)$ is fed back, via the halving element 114, to the junction of the capacitor 108 and the resistor 110. The halving element 114 halves the voltage received under the influence of the supply voltage on a "positive" pole. Another embodiment consists in that the inverting buffer element (74 LS 04) and the halving element 114 are replaced by a buffer which includes a non-inverting output and an inverting output which is fed by the junction of the resistors 110 and 112. Both output signals are applied to a differential amplifier whose output is connected to the junction of the capacitor and the resistor 110.

FIG. 10 shows a further alternative embodiment of the clock circuit shown in FIG. 8; this alternative somewhat resembles an implementation involving a phase-locked loop. In addition to the crystal 120, the output buffer 122 and the majority decision device 124 there are provided:

a feedback for the clock output signal to the negative input of a difference determining device 126;

an integrating network consisting of a resistor 128 and a capacitor 130;

a capacitor 132 whose capacitance can be adjusted by the integration result, thus enabling readjustment of the oscillation frequency.

FIG. 11 shows an alternative embodiment involving a phase-locked loop. The circuit includes a majority decision device 142, a multiplier circuit 142, a low-pass filter 144 LOPAS, a voltage-controlled oscillator 146, and an output buffer stage 148. A variation of the phase of the signal $d_i(t)$ is conducted through the low-pass filter LOPAS: fast variations, therefore, have no effect and are distributed in time. The function F is implemented by the loop: $0 < F' < < 1$. The phase-locked loop does not operate at its own resonant frequency, because the frequency of the signal $d_i(t)$ also depends on the phase-locked loops of the other clock circuits. The accuracy of the phase-locked loop and its internal phase shift must be taken into account in the same way as for the alternative embodiments including the bandfilter or the crystal.

It is to be noted that the various clock circuits in a multiple redundant clock system can be based on several of the principles of the FIG. 7 ... 11. Furthermore, various modifications of the circuits of the FIGS. 7 ... 11 are feasible.

What is claimed is:
1. A data processing device comprising:
   a. four parallel-operating data processing modules; and
   b. a multiple redundant clock device comprising:
      i. four clock circuits, each clock circuit being assigned to a respective one of the parallel-operating data processing modules and comprising:
         A. means for determining a binary two-thirds majority signal from output clock signals of the three other clock circuits;

B. means for generating a clock function signal under control of said majority signal, said generating means gradually adjusting said clock function signal to reduce a deviation, between said majority signal and said clock function signal, by a deviation reduction factor which is substantially smaller than one for each signal transition in the majority signal;

C. output means, responsive to the clock function signal, for supplying a respective local output clock signal; and ii. an interconnection network for communicating the output clock signals between the clock circuits.

2. A multiple redundant clock device for use in a data processing device which includes four parallel-operating data processing modules, the clock device comprising:

a. four clock circuits, each clock circuit being assigned to a respective one of the parallel-operating data processing modules and comprising:

i. means for determining a binary two-thirds majority signal from output clock signals of the three other clock circuits;

ii. means for generating a clock function signal under control of said majority signal, said generating means gradually adjusting said clock function signal to reduce a deviation, between said majority signal and said clock function signal, by a deviation reduction factor which is substantially smaller than one for each signal transition in the majority signal;

iii. output means, responsive to the clock function signal, for supplying a respective local output clock signal; and b. an interconnection network for communicating the output clock signals between the clock circuits.

3. The device of claim 1 or 2 wherein the deviation reduction factor is less than or equal to 0.5.

4. The device of claim 1 or 2 wherein the deviation reduction factor is less than or equal to 0.1 for each signal transition in the majority signal.

5. The device of claim 1 or 2 wherein:

a. the generating means comprises an LRC band filter, having an input coupled to receive the majority decision signal; and b. the output means comprises a buffer at an output of the LCR band filter.

6. The device of claim 1 or 2 wherein:

a. the means for generating includes a crystal having a first connection coupled with an output of the determining means; and b. the output means comprises a second, buffered connection of the crystal.

7. The device of claim 6 wherein the output means further comprises:

a. a capacitor;
b. a feedback element;
c. a buffer having an input at the second connection of the crystal and an output at which the local output clock signal is supplied; and
d. a voltage divider coupled with the second connection of the crystal, the voltage divider having a first side for coupling to a first potential, and a second side for coupling via the capacitor to a second potential and for coupling via the feedback element to the output of the buffer.

8. The device of claim 1 or 2 wherein:

a. said output means is an output line;
b. the generating means comprises:
  i. a buffer element having an output connected to said output line;
  ii. a crystal unit comprising:
    A. a first connection directly connected to the output line;
    B. a second connection connected to said output line via the buffer element;
    C. a variable capacitor coupled between the first and second connections;
  iii. a difference determining device having a first input coupled to the output line and and a second input coupled to receive the majority signal and having an output;
  iv. an integrator element coupled to the output of the difference determining device and to a control input of the variable capacitor, so that the difference determining means controls the variable capacitor via the intergrator element.

9. The device of claim 1 or 2 wherein:

a. the output means comprises a buffer element having an output at which the local clock signal is supplied; and
b. the generating means comprises a phase-locked loop which comprises:
  i. a controlled oscillator, having an output coupled to an input of the buffer element and having an input;
  ii. a multiplier element, having a first input coupled to the output of the controlled oscillator, a second input coupled to receive the majority signal, and an output; and
  iii. a low-pass filter having an input coupled with the output of the multiplier element and an output coupled with the input of the controlled oscillator.

10. A clock circuit for use, with three other analogous clock circuits in a multiple redundant clock device which produces output clock signals for four parallel-operating data processing modules in a data processing device, each clock circuit being assigned to a respective one of the parallel-operating data processing modules, the clock circuit comprising:

a. means for determining a binary two-thirds majority signal from the output clock signals of the three other clock circuits;

b. means for generating a clock function signal under control of said majority signal, said generating means gradually adjusting said clock function signal to reduce a deviation, between said majority signal and said clock function signal, by a deviation reduction factor which is substantially smaller than one for each signal transition in the majority signal; and c. output means, responsive to the clock function signal, for supplying a respective local output clock signal.

11. The clock circuit of claim 10 wherein the deviation reduction factor is less than or equal to 0.5.

12. The clock circuit of claim 10 wherein the deviation reduction factor is less than or equal to 0.1.

13. The clock circuit of claim 10 wherein:

a. the generating means comprises an LRC band filter, having an input coupled to receive the majority decision signal; and b. the output means comprises a buffer at an output of the LCR band filter.

14. The clock circuit of claim 10 wherein:
   a. the means for generating includes a crystal having a first connection coupled with an output of the determining means; and
   b. the output means comprises a second, buffered connection of the crystal.

15. The clock circuit of claim 14 wherein the output means further comprises:
   a. a capacitor;
   b. a feedback element;
   c. a buffer having an input at the second connection of the crystal and an output and which the local signal is supplied;
   d. a voltage divider coupled with the second connection of the crystal, the voltage divider having a first side for coupling to a first potential, and a second side for coupling via the capacitor to a second potential and for coupling via the feedback element of the output of the buffer.

16. The clock circuit of claim 10 wherein:
   a. said output means is an output line;
   b. the generating means comprises:
      i. a buffer element having an output connected to said output line;
      ii. a crystal unit comprising
         A. a first connection directly connected to the output line;
         B. a second connection connected to said output line via the buffer element;
         C. a variable capacitor coupled between the first and second connections;
      iii. a difference determining device having a first input coupled to the output line and and a second input coupled to receive the majority signal and having an output;
      iv. an integrator element coupled to the output of the difference determining device and to a control input of the variable capacitor, so that the difference determining means controls the variable capacitor via the integrator element.

17. The clock circuit of claim 10 wherein:
   a. the output means comprises a buffer element having an output at which the local clock signal is supplied; and
   b. the generating means comprises a phase-locked loop which comprises:
      i. a controlled oscillator, having an output coupled to an input of the buffer element and having an input;
      ii. a multiplier element, having a first input coupled to the output of the controlled oscillator, a second input coupled to receive the majority signal, and an output; and
      iii. a low-pass filter having an input coupled with the output of the multiplier element and an output coupled with the input of the controlled oscillator.

* * * * *